May 8, 1962 R. A. HANSON 3,032,852
MACHINE FOR LAYING JOINTLESS CONCRETE PIPE
Filed March 14, 1960 11 Sheets-Sheet 1

INVENTOR.
Raymond A. Hanson
BY
Atty.

May 8, 1962  R. A. HANSON  3,032,852
MACHINE FOR LAYING JOINTLESS CONCRETE PIPE
Filed March 14, 1960  11 Sheets-Sheet 4

INVENTOR.
Raymond A. Hanson
BY
atty.

May 8, 1962 R. A. HANSON 3,032,852
MACHINE FOR LAYING JOINTLESS CONCRETE PIPE
Filed March 14, 1960 11 Sheets-Sheet 5

Fig. 5

INVENTOR.
Raymond A. Hanson
BY
atty.

Fig. 6

INVENTOR.
Raymond A. Hanson

May 8, 1962 R. A. HANSON 3,032,852
MACHINE FOR LAYING JOINTLESS CONCRETE PIPE
Filed March 14, 1960 11 Sheets-Sheet 7

INVENTOR.
Raymond A. Hanson
BY
Greehwelix
Atty.

May 8, 1962 R. A. HANSON 3,032,852
MACHINE FOR LAYING JOINTLESS CONCRETE PIPE
Filed March 14, 1960 11 Sheets-Sheet 9

INVENTOR.
Raymond A. Hanson
BY
Greenwell
Atty.

United States Patent Office 3,032,852
Patented May 8, 1962

3,032,852
MACHINE FOR LAYING JOINTLESS
CONCRETE PIPE
Raymond A. Hanson, Palouse, Wash., assignor to The
First National Bank, Pullman, Wash.
Filed Mar. 14, 1960, Ser. No. 14,864
4 Claims. (Cl. 25—32)

This invention relates to a novel machine for laying jointless concrete pipe.

The present machine is designed to lay concrete pipe in place. It utilizes a pre-cut trench as support and forms for the lower portion of the pipe. A permanent or temporary inner full-circle form is used to insure an accurate, uniform pipe. The top of the pipe is formed by a troweling action of the machine.

It is an object of the invention to provide such a machine wherein the concrete is separated from the trench as it is fed into place in the machine.

It is a further object of the machine to provide adjustments for varying the pipe grade and to vary the thickness of the upper and lower pipe walls. Further adjustment of the troweling pressure is also obtainable according to the invention.

Another object is to maintain the machine in a uniform position in the trench by means of outboard wheels which are adapted to travel along the trench sides.

It is still a further object of the invention to hinge the machine without interfering with the use of the inner forms.

It is another object to guide the forms into place by means of pressure applying elements, which gradually encompass the form to thereby urge it into the proper lapping relationship.

These and still further objects will be apparent from the following disclosure and the accompanying drawings, which show one form of the invention. This form is exemplary only, being subject to many modifications within the bounds of the invention. Therefore the disclosure herein is not intended as a definition of the invention, which is set forth in the claims succeeding it.

Referring now to the drawings and to FIGURES 1-7 in particular, the general arrangement of the machine will be described. Throughout the description the right hand end of the machine as viewed in FIGURE 1 shall be designated as the forward end of the machine. The left hand end shall be the rear end of the machine. The direction of travel is shown by the arrow directly below the machine in FIGURE 1.

The machine comprises three main portions, which, proceeding rearwardly, are a front shoe 10, a rear shoe 11 and an extruding apparatus 12. The front shoe in this example houses the power plant for the machine. It has an open U-shaped configuration formed from bent walls 13. The forward ends of walls 13 are narrowed both transversely and vertically at the bottom, shown at 14. The shape of the walls 13 is such as to conform to the trench in which pipe is to be layed, while the narrowed ends 14 provide a sled-like action while the machine is dragged along the trench.

The upper ends of walls 13 are joined by a forward brace 15 and a rear brace 16. Mounted within the shoe 10 is an engine 19 of any desired type, which drives a hydraulic compressor 17. A hydraulic reservoir 18 is mounted adjacent the engine 19. A hydraulically operated winch is shown at 20 and is located forward of the engine 19 at the lower portion of shoe 10.

The rear shoe 11 has a U-shaped cross-section identical to that of shoe 10. Shoe 11 is formed of walls 21 which are bent as desired. Braces 22 form a rigid structure and are welded to walls 21 to provide the necessary strength to maintain their shape.

Figure 1:
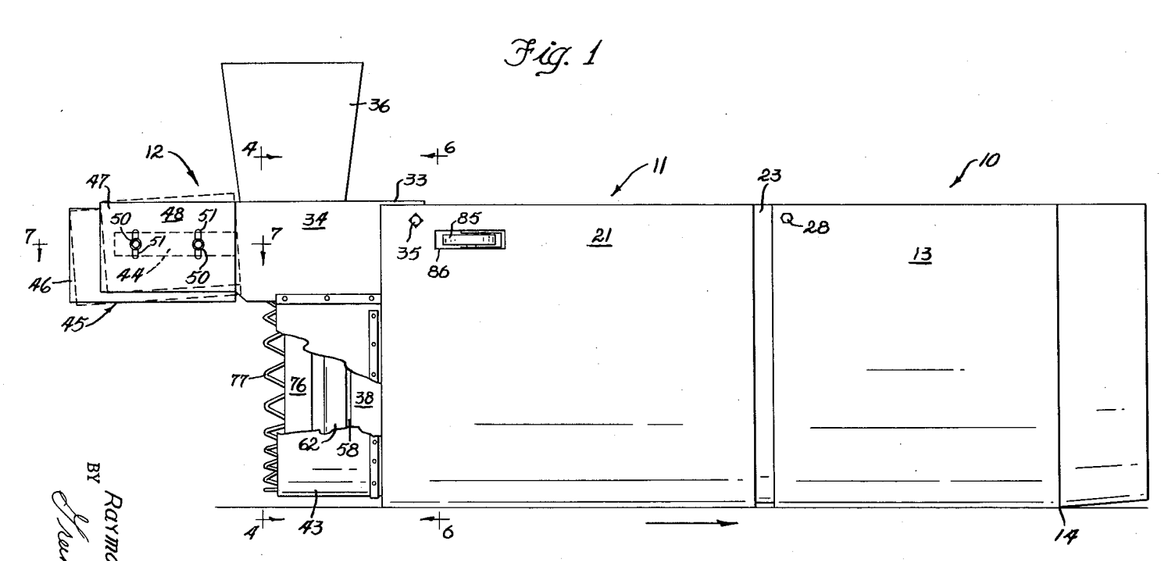
FIGURE 1 is a side view of the machine constructed according to this invention with a portion of the trench skirt broken away.
Figure 2:
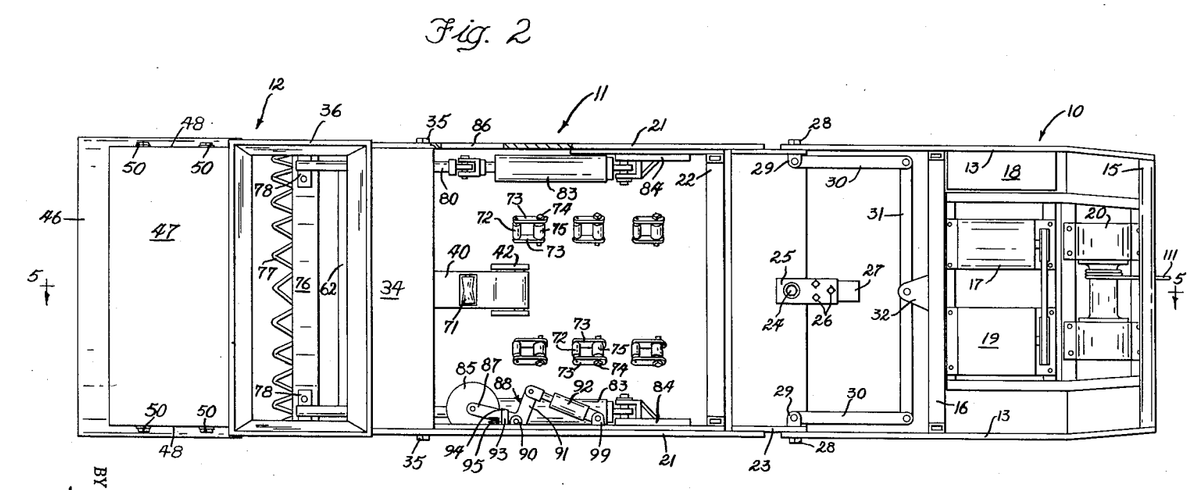
FIGURE 2 is a top plan view of the machine shown in FIGURE 1.

A hinge between the front shoe 10 and the rear shoe 11 is shown in FIGURES 1 and 2. A short U-shaped section 23 is welded to the inner surface of walls 21 at their forward end. Section 23 insures the uniformity of cross-sectional dimensions of the two shoes 10 and 11. At the bottom center of section 23 is a pivot bolt 24 which extends through a rectangular pivot plate 25. Plate 25 extends parallel to the bottom of wall 13 and is bolted by bolts 26 to a spacer plate 27 which is welded to the interior of walls 13. The thickness of plate 27 is equal to the thickness of section 23 so as to prevent binding of the pivot plate 25 when turning on a radius.

The side walls of section 23 and front shoe 10 are slidably joined by means of bolts 28. These bolts 28 extend through a corresponding aperture in walls 13 and a horizontal slot in the section 23. This sliding motion allows the front shoe 10 to pivot about a limited radius with respect to the rear shoe 11. Although this radius must be quite large, it has been found to be about three times smaller than the maximum turning radius possible without any hinge.

In order to brace the hinged structure against vertical movement which might be encountered in a stepped or uneven trench, a parallelogram arrangement at the top of the shoes has been provided. Ears 29 are formed inwardly near the top of section 23 on each side thereof. Pivoted to these ears 29 are two radius arms 30 which extend forwardly into the shoe 10. Radius arms 30 are pivoted at each end respectively of a cross-arm 31 which is pivoted at its center to a rearwardly extending ear 32 fixed to the rear brace 16. This radius arm structure will allow hinging in a horizontal plane, but will restrict any tendency of shoes 10 and 11 to pivot with respect to each other in a vertical plane. Such movement, if not limited, would tend to move the concrete forms and seriously impede the quality of pipe produced.

The length of shoes 10 and 11 is largely a matter of choice. Shoe 10 must be long enough to accommodate the desired engine. Shoe 11 must be long enough to accommodate at least one length of the forms being used for the pipe interior. In some instances it may be found desirable to make the open space between the rear end of shoe 11 and the rear brace 16 in shoe 10 long enough to accept two forms so as to allow proper lapping of the forms without being rushed. The important concept in the machine as described is the use of two separate shoes with a hinge between them so as to place the hinge near the center of the machine as an aid in turning.

The extruding apparatus 12 is mounted rearwardly with respect to the rear shoe 11. The two are joined by overlapping sides 33 which extend forwardly from a rectangular feed chamber 34. A bolt 35 mounted through the walls 21 on each side and through a vertical slot 39 in the sides 33 adjustably positions the height of the feed chamber 34 with respect to rear shoe 11. The width of feed chamber 34 is slightly less than the maximum width of shoe 11 so as to allow sides 33 to fit adjacent the interior surfaces of the side walls 21.

The upper surface of feed chamber 34 is provided with a rectangular opening across its width, into which a hopper 36 may be fitted. Hopper 36 has an expanded top opening and has vertical bottom sides which fit into the opening in feed chamber 34.

The feed chamber 34 is provided with a forward barrier wall 37 which closes off the upper portion of the feed chamber 34 and seals an outer barrier ring 38. Ring 38 is cylindrical and extends from barrier wall 37 forwardly to the ends of sides 33. It can be seen from FIGURE 1 that barrier wall 37 seals off the upper half of outer barrier ring 38. The lower half of ring 38 is freely positioned by wall 37, so as to be vertically adjustable within shoe 11.

A leaf hinge 40 connects the interior forward surface of outer barrier ring 38 and the central bottom interior surface of the rear shoe 11. This hinge 40 is pivoted at 41 and 42 to the ring 38 and shoe 11 respectively. It is sufficiently long to provide nearly straight line movement when ring 38 is moved vertically.

Figure 3:
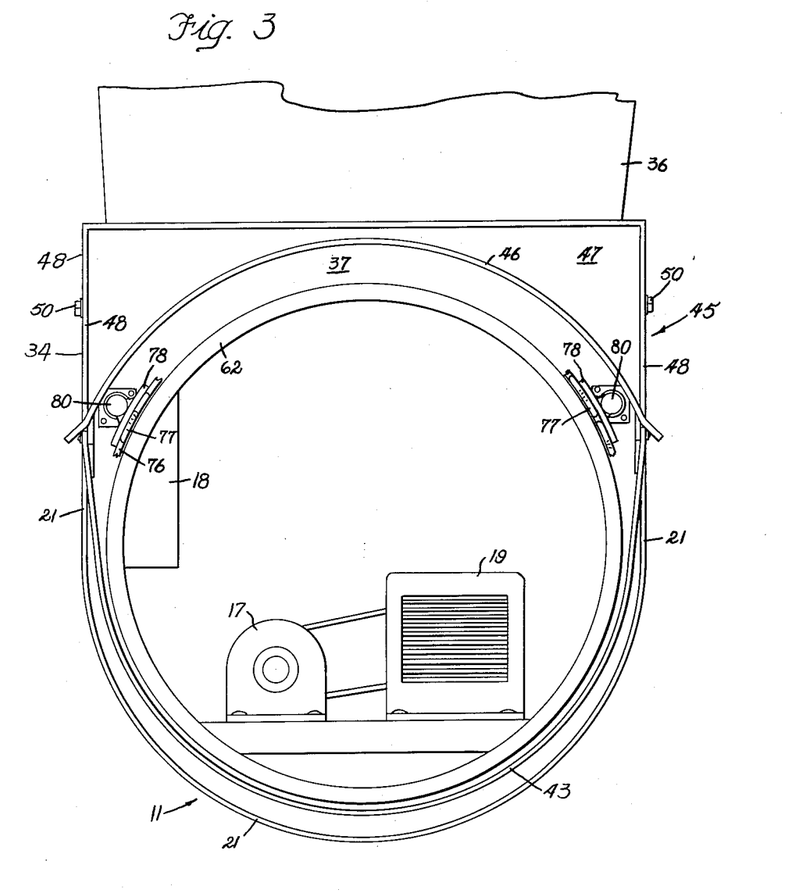
FIGURE 3 is an enlarged rear view of the machine, taken from the left end in FIGURE 1 with a portion of the hopper broken away.
Figure 4:
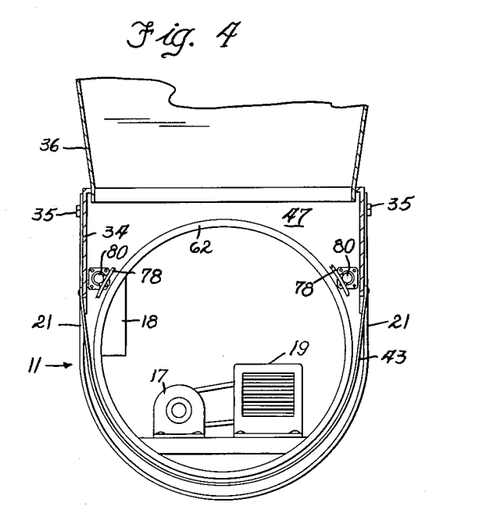
FIGURE 4 is a sectional view taken along line 4—4 in FIGURE 1 with a portion of the hopper broken away.
Figure 5:
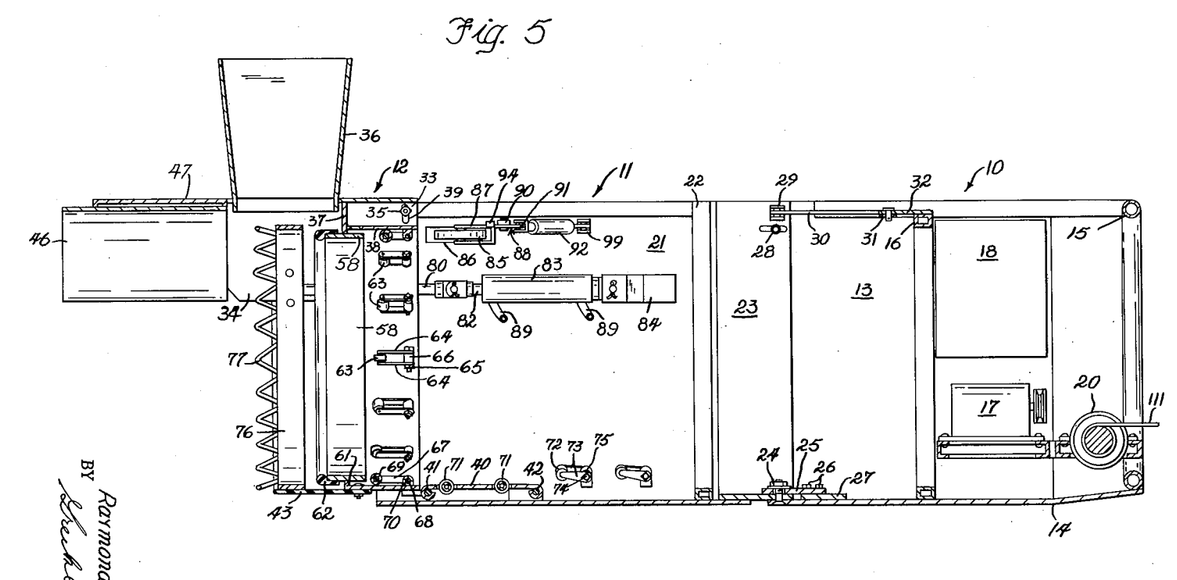
FIGURE 5 is a sectional view taken along line 5—5 in FIGURE 2.
Figure 6:
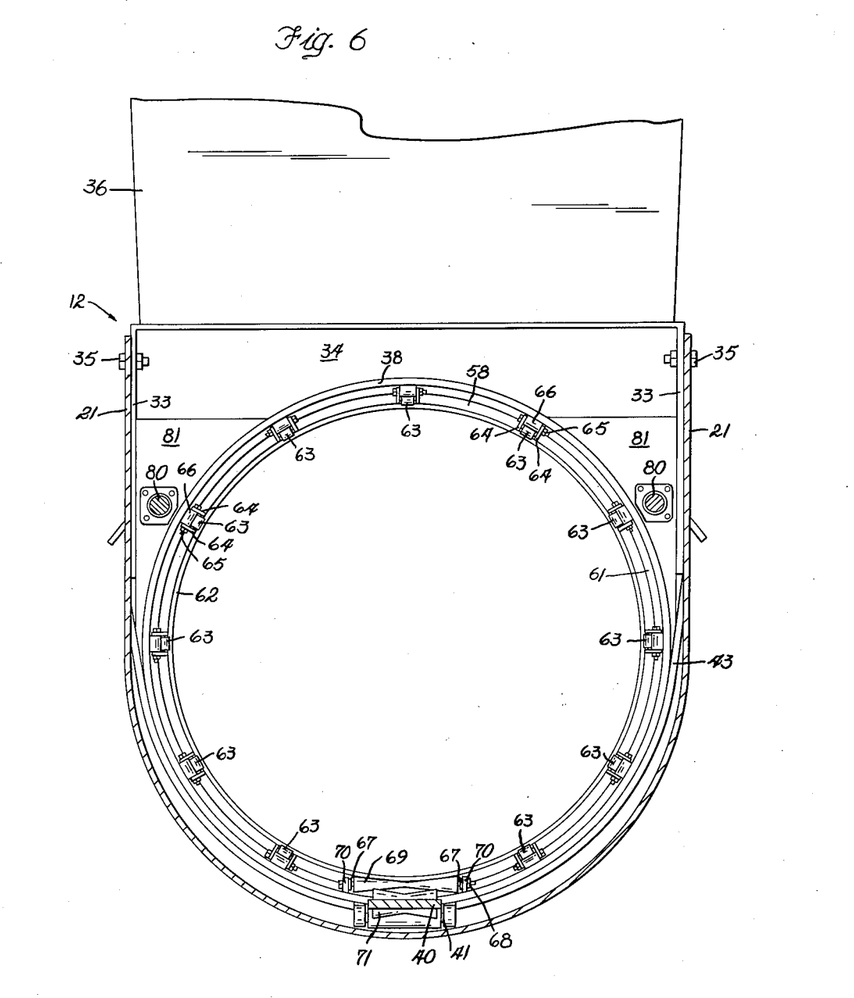
FIGURE 6 is an enlarged sectional view taken along line 6—6 in FIGURE 1 with a portion of the hopper broken away.
Figure 7:
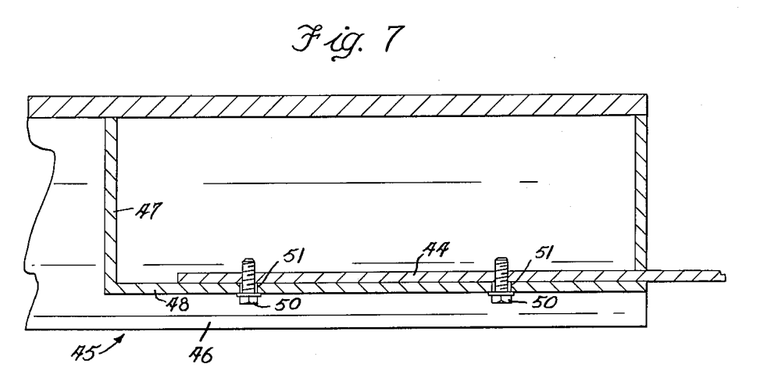
FIGURE 7 is an enlarged fragmentary sectional view taken alonge line 7—7 in FIGURE 1 showing one-half of the troweling skirt and its supports.

As can be seen in FIGURES 1 and 3, a flexible trench skirt 43 is attached at its upper ends to the feed chamber 34 and is fastened along its forward edge to the outer surface of the outer barrier ring 38. The trench skirt 43 is formed of resilient long-wearing material, such as the rubber belts used in conveyors. It must be sufficiently resilient to allow the rear edge of the skirt 43 to expand against the trench walls under the pressure of the incoming concrete. The purpose of skirt 43 will be more fully explained later.

The feed chamber 34 is provided with two rearwardly extending arms 44 which mount a trowel 45. Trowel 45 consists of a curved sheet of metal, 46, and an upper rectangular support structure 47 having sides 48. Arms 44 each have two threaded apertures cut therein, into which bolts 50 are inserted through slots 51 when the support structure 47 is fitted over the arms 44. Slots 51 are vertical slots cut into the sides 48 at the front and back portions of each side and are provided to allow vertical or angular adjustment of trowel 45.

Figure 15:
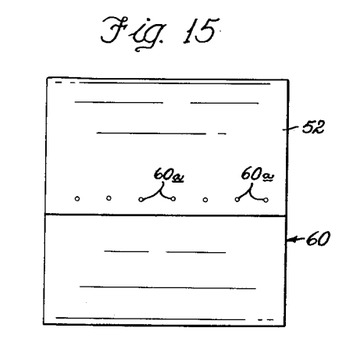
FIGURE 15 is a bottom view of one of the forms to be used in this invention.
Figure 16:
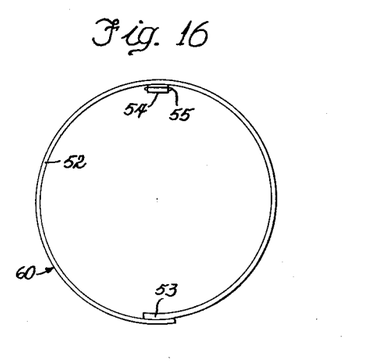
FIGURE 16 is an end view of the form shown in FIGURE 15.
Figure 17:
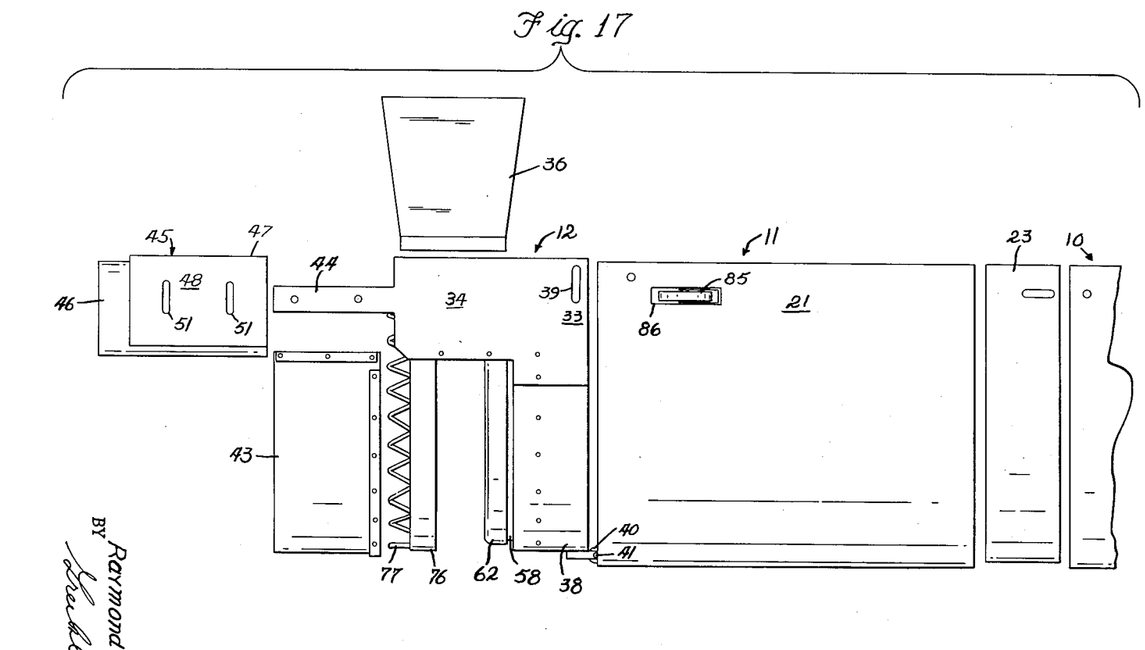
FIGURE 17 is an exploded side view of the invention with a portion of the front shoe broken away.

The forms 60 to be used are shown in FIGURES 15 and 16. They consist of split cylindrical shells 52 which overlap at their bottom portions as shown at 53. The forms are lapped longitudinally and are joined by hooks 54 and rings 55 alternately fixed at the upper portion of each shell 52 near the ends of the forms. The cylindrical shape of the form is maintained by tubular struts 56 having a generally circular shape, but including flat side portions 27.

A problem inherent in machines of this type is the entrapment of air beneath the form as the concrete flows toward the center from both sides of the form. In order to relieve this pressure, a row of holes 60a (see FIGURE 15) has been cut through the bottom surface of the form 60. These holes, plus the lapped seam 53 are sufficient to release trapped air without interfering with the use of the forms.

The forms 60 are to be inserted through the outer barrier ring 38. In order to seal the forward end of the forms 60 from the feed chamber 34, an inner barrier ring 58 is attached to a lip 61 bent inwardly from the rear edge of outer barrier ring 38. The inner barrier ring 58 extends rearwardly of the end of the outer barrier ring 38. A sealing strip 62 is wrapped around the outer periphery of ring 58 and is attached to it. The rear edge of sealing strip 62 has a circular cross-section and extends inwardly over the rear edge of ring 58. This circular section abuts the forms 60 to provide an effective seal all around the form.

In order to ease the forms into place under pressure, a series of circumferentially spaced rollers 63 are positioned about the interior of outer sealing ring 38. Each roller 63 is rotatably mounted between two support arms 64 which are pivoted by bolts 65 extending through journals 66 attached to the forward interior surface of ring 38. The arms 64 extend rearwardly so as to place the rollers 63 adjacent to the front edge of the inner barrier ring 58. The rollers 63 are progressively spaced from the edge of ring 58, as can best be seen in FIGURE 5. The lowermost roller is closest to the ring 58, while the top roller is spaced the greatest distance from it. The bottom roller in the ring 38 is designated 69 and is a concave roller for greater support of the form lap 53. This roller 69 is rotatably journaled between two support arms 67 which are pivoted by means of bolt 68 and ears 70 to ring 38 in the same manner as are the rollers 63. The support arms 67 straddle the rear end of the leaf hinge 40. Bolts 65 and 68 are tightened to position rollers 63 and 69 respectively. The progressive engagement of forms 60 with the rollers 63 and 69 aids in gradually shaping the forms under pressure as the lap 53 is defined. The rollers may be spring biased if desired or may be replaced by flat fingers or other pressure engaging structures which will yield like results.

In order to ease the forms 60 into place, a series of small concave rollers 71 are rotatably journaled on the upper surface of the leaf hinge 40. These rollers will thereby guide the elevation of the forms 60 independent of the vertical height of the feed chamber 34 with respect to rear shoe 11. Forward of the leaf hinge 40 are two rows of rollers 72 mounted on support arms 73 which are pivoted by means of bolts 74 to ears 75 welded to the floor of shoe 11. These rollers 72 may be adjusted to any desired height by tightening the bolts 74.

Consolidating means for compacting concrete fed into the feed chamber 34 are provided in this machine. Although reciprocal movement is utilized, any one of several forms of such consolidators may be substituted in its place as described in my co-pending application, Serial No. 849,877, filed on October 30, 1959, for Consolidator for Monolith Concrete Pipe Laying Machines. The consolidator ring 76 has rearwardly extending bent rods 77 attached to it with push concrete both rearwardly and transversely when reciprocated. The ring 76 is attached to two mounting brackets 78 by means of bolts. The brackets 78 are carried by rods 80 which extend through the forward barrier wall 37 and through a plate 81 joining a portion of the rearward edges of outer barrier ring 58 and sides 33. Rods 80 are connected at their forward ends to the piston rods 82 of double acting hydraulic cylinders 83. The connections between piston rods 82 and rods 80 are pivotable yokes, to accommodate vertical movement of the extruding apparatus 12. The cylinders 83 are pivotally mounted to the interiors of side walls 21 by means of yoke mounting brackets 84. Cylinders 83 are supplied with hydraulic fluid from reservoir 18 by means of hydraulic lines 89 which are connected to reservoir 18 by means of suitable control valves to produce the desired reciprocal movement.

There is a tendency in such machines to lean against one or the other of the trench walls. This cannot be eliminated by trenching methods, since some clearance must be allowed between the trench and the shoes 10 and 11. To keep the machine on an even keel, particularly when turning, two outboard wheels 85 are provided. Wheels 85 are mounted through slots 86 cut into the upper rear walls 21 of shoe 11, so as to closely control movement of the forms 60 as they are fed through the feed chamber 34. Each wheel 85 is rotatably mounted on an arm 87 of a bell crank 88 which is pivoted to ears 90 fixed to the interior of walls 21. The remaining arm 91 of bell crank 88 is pivoted to a piston rod of a single-acting hydraulic cylinder 92 which is pivotally mounted on the interior surface of wall 21 by means of bracket 99. A ledge 93 extends below the arm 87 from wall 21 and terminates in a stop 94 which lies in the path of movement of arm 87. Stop 94 limits inward movement of wheel 85 to a position wherein it lies fully within the shoe 11. A spring 95 is mounted between the interior of wall 21 and arm 87 which biases the bell crank 88 inwardly and opposes the action of the hydraulic cylinder 92. The two cylinders 92 are supplied with fluid from reservoir 18 and are manually controllable by individual valves of common design.

Figure 8:
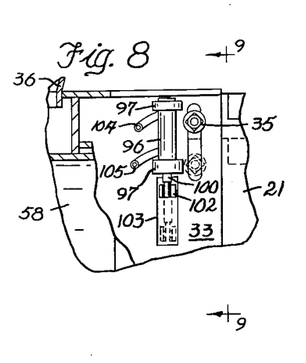
FIGURE 8 is a fragmentary view of the inner surface of one side wall showing a modified form of the invention.
Figure 9:
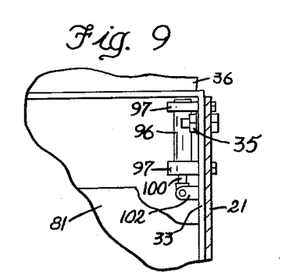
FIGURE 9 is a fragmentary sectional view taken substantially along line 9—9 in FIGURE 8.

A modification shown in FIGURE 8 provides for hydraulic adjustment of the vertical position of the extruding apparatus. The machine structure is identical in all respects with that previously disclosed except that bolts 35 are loosely tightened and serve only as slidable guides to maintain walls 21 and the overlapping sides 33 adjacent to one another. A hydraulic cylinder 96 is mounted by brackets 97 on the inner surfaces of sides 33. The piston shaft 100 extends downwardly and is anchored to a pivot anchor 102 which is vertically fixed to the wall 21 through a slot 103 cut into side 33. By this means, the relative vertical positions of sides 33 and 21 may be controlled by operation of the double acting cylinders 96. Cylinders 96 are connected by flexible hoses 104 and 105 to suitable controls and receive their fluid supply from the reservoir 18. The controls may be manual, or may be automatic grade controls, such as disclosed in my copending application, Serial No. 642,310, filed February 25, 1957, now Patent 2,952,928, for Grade Control for Digging Machines. Such automatic controls will insure a constant grade in the interior of the pipe.

Figure 13:
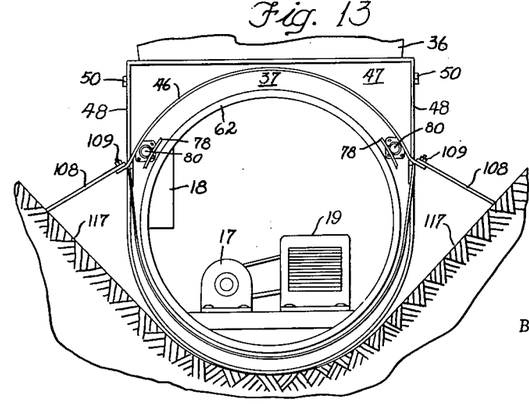
FIGURE 13 is a rear view of the machine similar to FIGURE 3, but showing extensions on the troweling skirt.
Figure 14:
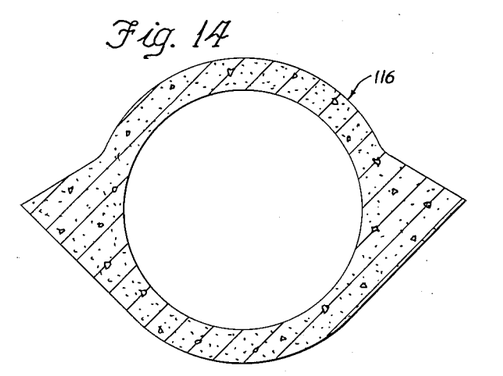
FIGURE 14 is a cross-sectional view of concrete pipe as laid with the extensions as shown in FIGURE 13.

In cases where loose soil is encountered, a trench with vertical walls may be impossible to maintain. Therefore, sloping walls, 117 such as shown in FIGURES 13 and 14 are utilized. A pair of plates 108 are bolted to side ends of the trowel 46 by means of bolts 109. These rectangular plates 108 enlarge the arched walls of the pipe 116 to uniformly fill the trench walls 117.

Operation of the Machine

Figure 18:
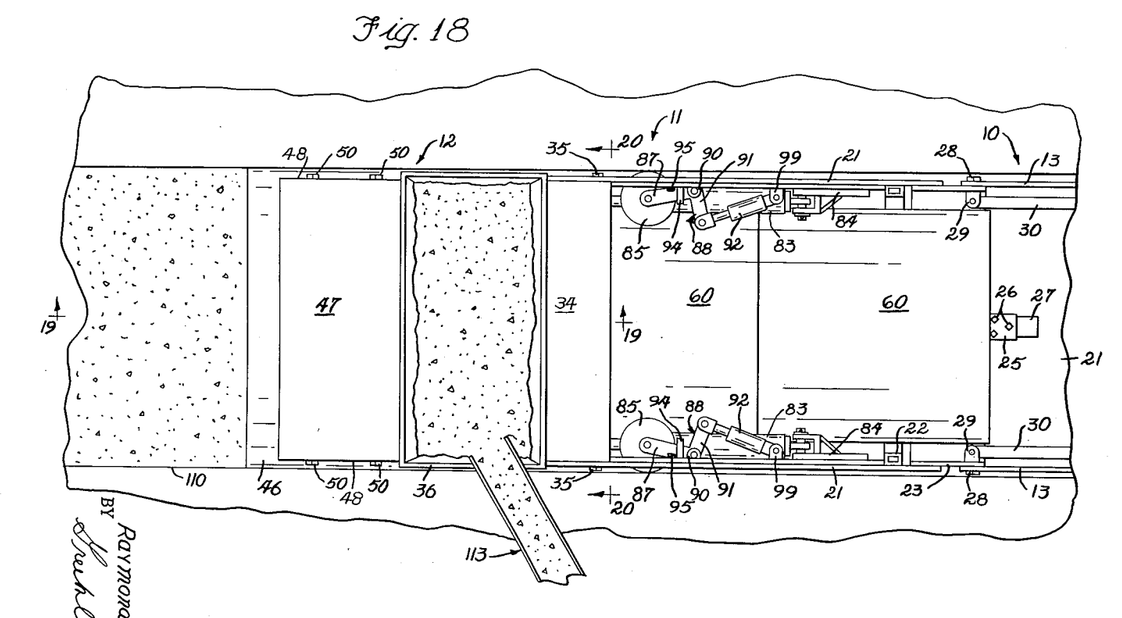
FIGURE 18 is a fragmentary top plan view of the machine in operation with portions of the surrounding structure and the front shoe broken away.
Figure 19:
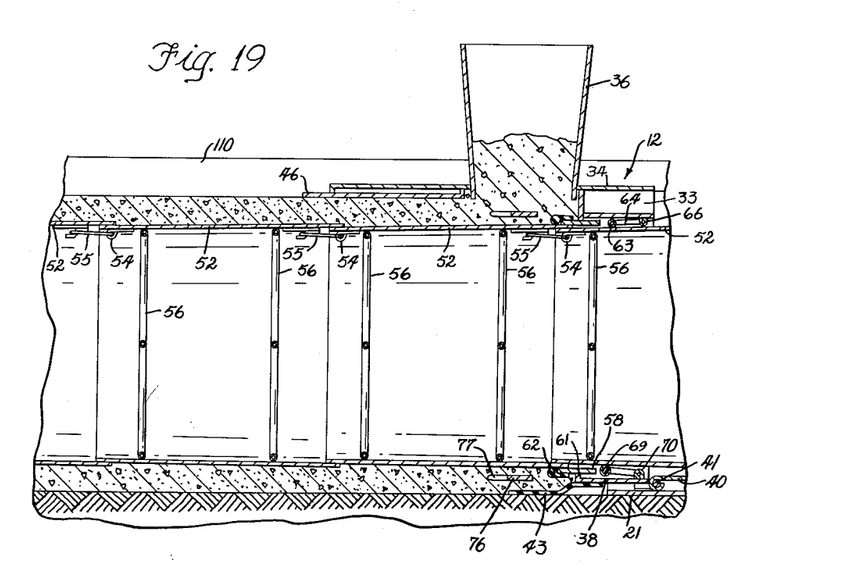
FIGURE 19 is a fragmentary sectional view taken along line 19—19 in FIGURE 18.
Figure 20:
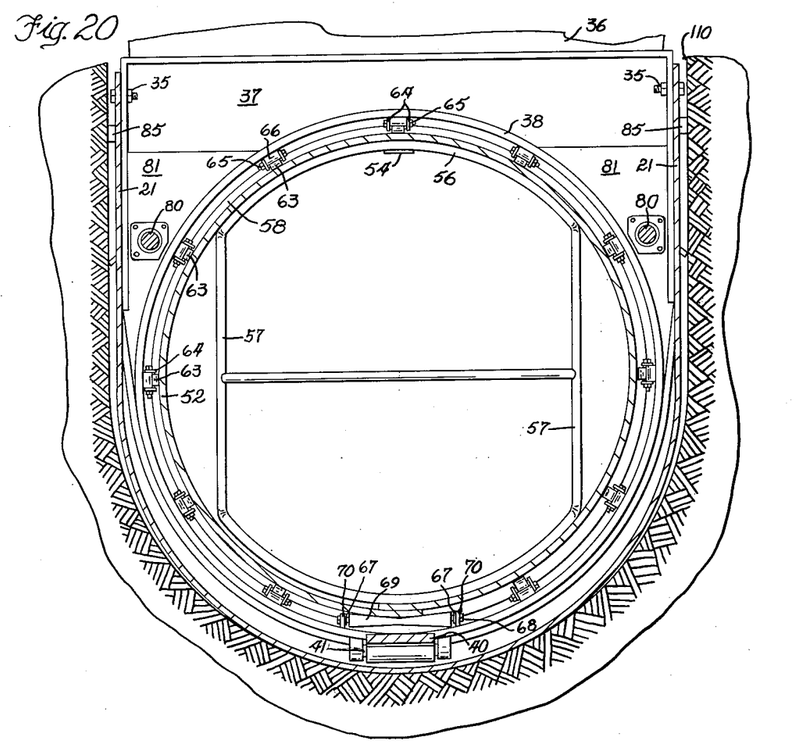
FIGURE 20 is a fragmentary sectional view taken along line 20—20 in FIGURE 18 with a portion of the hopper broken away.

The general operation of the machine is illustrated in FIGURES 18, 19, and 20. A pre-formed trench 110 is cut to the outside dimensions of the pipe and is cut to the proper grade. This trench 110 ordinarily has a semi-circular lower section, terminating in vertical sides. The machine is then dropped into place in the trench and a chain or cable 111 is attached to the winch 20. The outer end of the chain or cable 111 is anchored forward of the machine to a fixed object such as an anchor post. The hydraulically operated winch 20 is then used to slowly pull the machine along the trench as concrete is being poured.

Concrete is normally fed in a pre-mixed condition through the top opening of hopper 36. The concrete is shown being fed by a chute 113 which may be truck mounted. When an upper obstruction is encountered, such as a cross-pipeline or road, hopper 36 may be easily removed and the vertical height of the machine thereby reduced.

As concrete is fed into the feed chamber 34 it is constantly agitated by the reciprocating consolidator ring 76. The concrete flows downwardly and surrounds the form 60, which is extended through the barrier wall 37 as previously described. The flexible trench skirt 43 serves two distinct purposes. First, it seals off the forward area between the lower portion of the outer barrier ring 38 and the trench 110 which is otherwise open. This prevents concrete from escaping under the shoe 11, regardless of the vertical height of the extruding apparatus with respect to shoe 11. Secondly, the skirt 43 defines a "pouring region" wherein the concrete may flow around the form 60 without contacting the bare trench walls. It has been found that the concrete tends to form balls when mixed with the soil as it falls along the trench walls. These balls have a covering of dry sand or soil and detract from the normal wall strength of the pipe producing a non-uniform pipe. The skirt 43 allows the concrete to flow freely into position. Since skirt 43 does not quite cover the rear fingers of the consolidator ring 76, the concrete is then finally consolidated as it is being extruded from the skirt 43 into its final position. This eliminates relative movement of the concrete and trench—the only relative movement being that between the machine and the trench.

Figure 10:
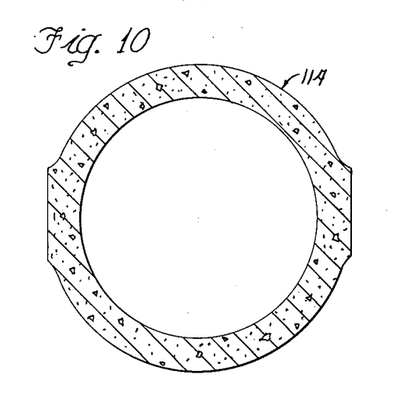
FIGURE 10 is a cross-sectional view of normal pipe as laid by the machine.

The machine as shown is highly adaptable to many desired conditions. The normal pipeline cross-section is shown in FIGURE 10, the pipe being designated as 114. Should any other interior or exterior cross-section be desired, the machine components, forms and trench may be varied to suit the required demands.

Figure 11:
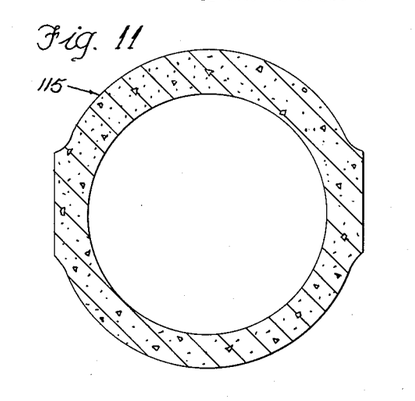
FIGURE 11 is a cross-sectional view of pipe laid with the troweling skirt in an elevated position.

The top section of the pipe may be strengthened by raising the trowel 45. Trowel 45 may also be tilted rearwardly as shown in dashed lines in FIGURE 1 to increase the troweling pressure and thereby compact the top area of the pipe. Such a strengthened cross-section is shown in FIGURE 11, the pipe being designated as 115. Should a stronger cross-section be desired, a trowel 45 may be easily substituted, having a curved sheet 46 with a higher central area, which greatly increases the arched strength of the pipe.

Figure 12:
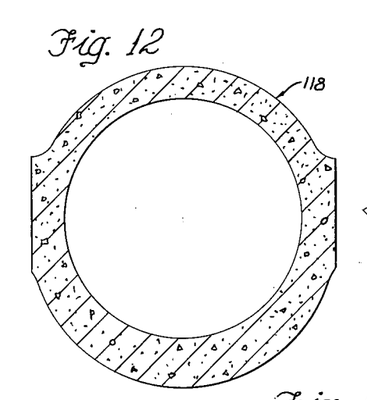
FIGURE 12 is a cross-sectional view of pipe laid with the entire rear section raised.

As described, the extruding apparatus 12 may be raised or lowered either manually or by hydraulic means. This will increase or decrease the bottom thickness of the pipe 118, as seen in FIGURE 12 where the machine used in FIGURE 10 has had its extruding apparatus raised. The entire pipe interior is thereby raised. In this manner the grade of the pipe 118 can be varied or maintained uniform regardless of trench depth, while laying a uniform pipe.

Uniformity of the pipe is further insured by use of the outboard wheels 85 and by the central hinge 24 which have been previously described. The use of positive pressure to position the forms 60 is highly advantageous in holding the forms securely as the pipe is being formed.

After the pipe has been laid, the struts 56 are rotated and pulled out, and the forms 60 are pulled from the pipe by a chain. This may be done in the morning, before the machine is replaced in trench 110. The forms are pulled forwardly and are then properly positioned along trench 110 for the day's operations. The pipe may be covered with soil immediately after being layed or following the curing of the concrete as desired.

Many obvious modifications and equivalents will propose themselves to one trained in this art after studying this disclosure. Since the machine shown is entirely exemplary, such modifications are not intended to detract from the invention insofar as they fall within its scope. The scope of the invention is aptly defined in the following claims.

Having thus described my invention, I claim:

1. A machine for laying jointless concrete pipe in a preformed trench comprising a forward shoe portion shaped to conform to the trench cross-section, an extruding apparatus mounted at the rear end of said shoe portion, vertically adjustable means connecting said extruding apparatus and said shoe portion, and leaf hinge means connecting the lower portion of said extruding apparatus and said shoe portion, and flexible means mounted on the rear peripheral edge of said extruding apparatus along the side and bottom portions thereof and extending rearwardly therefrom, said flexible means being adapted to conform to the bottom trench configuration when subjected to the weight of concrete being poured into said extruding apparatus.

2. A machine for laying jointless concrete pipe in a preformed trench comprising a forward shoe portion shaped to conform to the trench cross-section and adapted to ride along the bottom of the trench, extruding means mounted at the rear end of said shoe portion, vertically adjustable means connecting said extruding means and said shoe portion, said extruding means including an upright barrier having an aperture adapted to receive pipe inner forms, and further including a vertical barrier wall fixed to the barrier and extending upwardly therefrom adapted to seal the upper portion of said extruding means from said shoe portion, and a flexible skirt fixed to the lower periphery of said upright barrier extending continuously from the two peripheral connections of said barrier and said barrier wall about the lower area of the barrier and extending rearwardly therefrom, said flexible skirt being adapted to seal the remaining area of said extruding means from said shoe portion when pressed against the trench walls by poured concrete.

3. A device as defined in claim 2 wherein said extruding means includes material consolidating means spaced circumferentially about said aperture rearwardly of said barrier and movably supported by said vertical barrier wall, drive means in said shoe operatively connected to said consolidating means, said drive means being operable to move the consolidating means within the space surrounding the pipe inner forms, said flexible skirt being of a width sufficient to extend along a substantial portion of said consolidating means.

4. An apparatus for producing pipe from cementitious material poured directly in a trench having bottom and side transverse configurations formed to the desired exterior configuration of the finished pipe, comprising shoe means having a bottom transverse contour adapted to be slidably supported along the trench bottom, an extruding apparatus including a forward vertical barrier wall, means connecting siad extruding apparatus and said shoe means at the rear end of said shoe means adapted to fix the elevational position of said vertical barrier wall relative to said shoe means, said vertical barrier wall being provided with an opening adapted to slidably receive inner conduit form means from within said shoe means, a hopper positioned above said extruding apparatus rearward of the vertical barrier wall adapted to direct concrete received therein to the confines of said extruding apparatus, a top conduit shaping outer form mounted on said extruding apparatus and extending from the extruding apparatus rearwardly of the hopper in the longitudinal direction of the trench, material consolidating means spaced circumferentially about the barrier wall opening at a location rearwardly spaced from said barrier wall, said material consolidating means being movably supported on the barrier wall, drive means located within said shoe means operatively connected to said material consolidating means, said drive means being adapted to move the consolidating means within the space bounded by the trench surfaces and the elevation of the top upper form, and a flexible skirt fixed along its forward edge to said vertical barrier wall about the lower periphery of the barrier wall opening, said skirt being of a width sufficient to extend rearwardly from said vertical barrier wall along a substantial portion of the width of said material consolidating means, said skirt being adapted to expand outwardly against the bottom and side walls of the trench under the weight of cementitious material directed to the extruding apparatus through said hopper.

References Cited in the file of this patent

UNITED STATES PATENTS

| | | |
|---|---|---|
| 817,383 | McIntyre | Apr. 10, 1906 |
| 952,488 | Wiggins | Mar. 22, 1910 |
| 1,606,160 | Foster | Nov. 9, 1926 |
| 2,731,698 | Tunsen | June 24, 1956 |
| 2,818,790 | Canfield | Jan. 7, 1958 |
| 2,968,081 | Williamson et al. | Jan. 17, 1961 |